(12) United States Patent
Goldberg

(10) Patent No.: US 7,254,856 B2
(45) Date of Patent: *Aug. 14, 2007

(54) CARABINER TOOL ASSEMBLY

(75) Inventor: Edward Goldberg, Teaneck, NJ (US)

(73) Assignee: Forever Green Holdings, LLC, Woodbridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/518,790

(22) Filed: Sep. 11, 2006

(65) Prior Publication Data

US 2007/0000063 A1    Jan. 4, 2007

Related U.S. Application Data

(63) Continuation of application No. 10/690,362, filed on Oct. 21, 2003, now Pat. No. 7,111,349.

(51) Int. Cl.
*B25B 11/00*    (2006.01)
(52) U.S. Cl. .................................. 7/164; 7/165; 7/167
(58) Field of Classification Search ................ 7/161, 7/164, 165, 167
See application file for complete search history.

(56) References Cited

U.S. PATENT DOCUMENTS

| 4,438,538 A | 3/1984 | Larsen |
| 4,580,347 A | 4/1986 | McKnight |
| 5,270,909 A | 12/1993 | Weiss et al. |
| 5,553,340 A | 9/1996 | Brown, Jr. |
| 5,815,873 A | 10/1998 | Jones |
| 6,098,226 A | 8/2000 | Lin |
| 6,223,372 B1 | 5/2001 | Barber |
| 6,276,014 B1 | 8/2001 | Lee |
| D459,338 S | 6/2002 | Sterzick |
| D469,023 S | 1/2003 | Mah |
| 6,527,434 B1 | 3/2003 | Fox et al. |

OTHER PUBLICATIONS www.demstore.com website pages regarding Carabiners Light the Way item, Jun. 25, 2004, 4 pgs.
www.branders.com website pages regarding Carabiner Flashlight item, Jun. 25, 2004, 2 pgs.

*Primary Examiner*—Jacob K. Ackun, Jr.
(74) *Attorney, Agent, or Firm*—Michael R. Gilman; Kaplan Gilman Gibson & Dernier LLP

(57) ABSTRACT

A carabiner tool assembly is provided. The tool assembly comprises in one embodiment a body portion for storing a tool having a longitudinal length and a carabiner assembly. The body portion comprises an outside shell forming an interior chamber and an opening extending through the outside shell through to the interior chamber, the opening being sized to be only slightly larger than needed to pass the tool through in a direction along the longitudinal length of the tool. The carabiner assembly comprises a first leg having a selectively openable gate assembly, the first leg extending from a first section of the body portion. A second leg extends from a second section of the body portion and a third leg extends between and connects the first and second legs, wherein the first, second and third legs of the carabiner assembly define another opening. The carabiner assembly can also have only two legs.

25 Claims, 2 Drawing Sheets

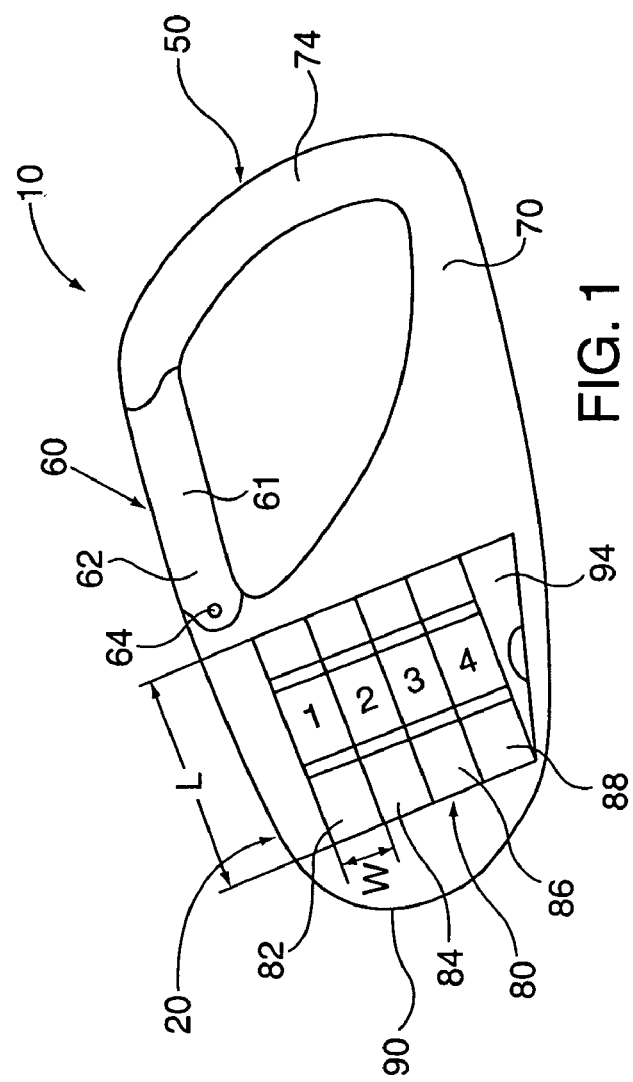
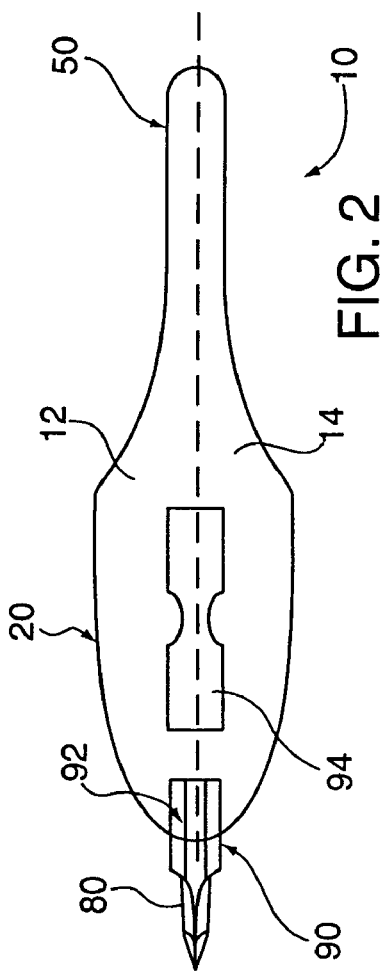
FIG. 1
FIG. 2

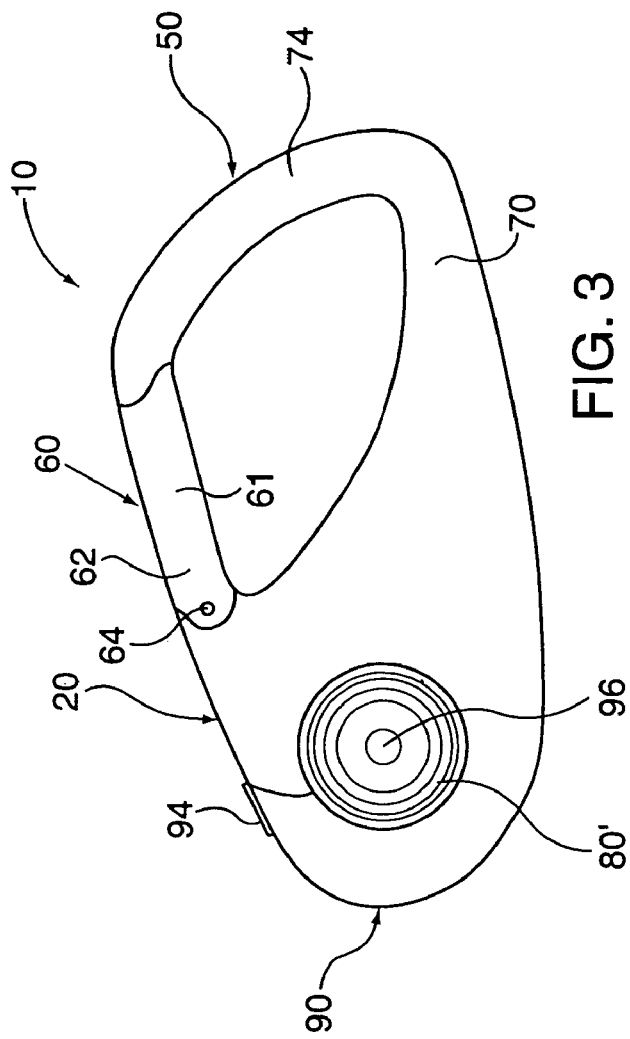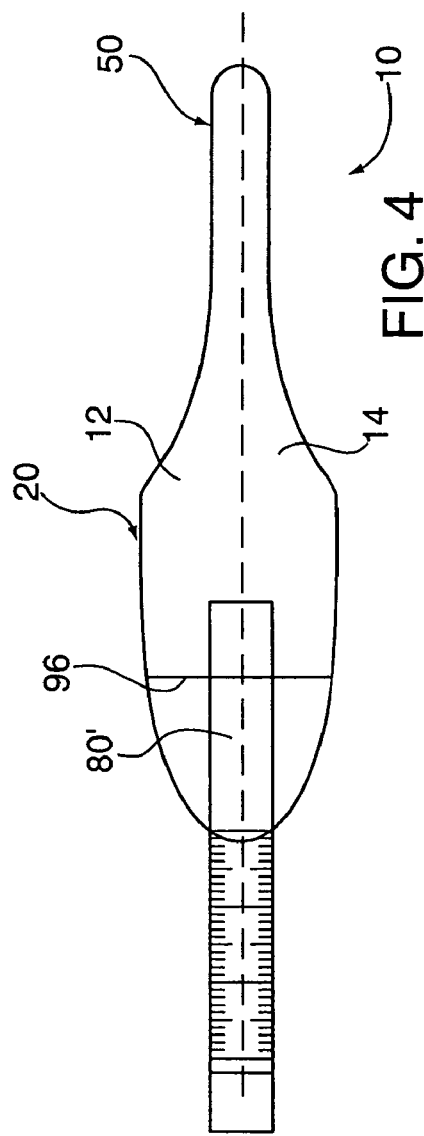

CARABINER TOOL ASSEMBLY

CROSS REFERENCE TO RELATED APPLICATIONS

This application is a continuation application to U.S. patent application Ser. No. 10/690,362, filed Oct. 21, 2003, now U.S. Pat. No. 7,111,349, entitled "Carabiner Tool Assembly," the entire disclosure of which is hereby incorporated by reference.

FIELD OF THE INVENTION

The invention relates generally to carabiner-type attachment devices, and more particularly, to a carabiner-type attachment device having further use as a standard tool, such as, but not limited to, a tape measure or a screwdriver/allan wrench.

BACKGROUND OF THE INVENTION

Carabiners have long been in use for providing a means for attaching articles to each other. Such devices have numerous applications, such as for example enabling articles to be quickly and easily secured to a backpack, purse, handbag, key chain, belt loop, utility belt, or the like. U.S. Pat. No. 5,005,266 discloses a typical carabiner-type attachment device.

It is also known that combination tools are useful. For example, the Swiss Army knife concept of taking a known item, such as a knife, and enhancing it through the incorporation of various types of other tools, such as, screwdrivers, combs, toothpicks, scissors, tweezers, eating utensils, can openers, and the like has been around for years. In some instances it has even been known to combine specific types of tools, such as knives and flashlights, as part of the standard construction of a carabiner; i.e., as one of the three legs of the carabiner body (see U.S. Pat. Nos. 5,270,909 and 6,223,372 and www.demstore.com and www.branders.com). It has further been known to combine a carabiner attachment device with standard items used everyday by individuals, such as radios (see U.S. Design Pat. No. D459, 338), compasses (see www.advantageindustries.com), and watches and chronometers (see U.S. Pat. No. 6,527,434 and U.S. Design Pat. No. D469,023 and www.promoplace.com).

Such prior art, while useful in their own right for achieving their specific purposes, are simply not what is disclosed in the subject invention, and so have no adverse bearing thereon.

As it is thus desirable to have the above types of items/tools made easily attachable/detachable to other items through the use of a carabiner-type construction, it would also be desirable to have items/tools such as a tape measure and an interchangeable head screwdriver/allan wrench made easily attachable/detachable through use of a carabiner-type attachment mechanism.

SUMMARY OF THE INVENTION

In accordance with the invention, a carabiner tool assembly is provided. The tool assembly comprises in one embodiment a body portion for storing a tool having a longitudinal length and a carabiner assembly. The body portion comprises an outside shell forming an interior chamber and an opening extending through the outside shell through to the interior chamber, the opening being sized to be only slightly larger than needed to pass the tool through in a direction along the longitudinal length of the tool. The carabiner assembly comprises a first leg having a selectively openable gate assembly, the first leg extending from a first section of the body portion. A second leg extends from a second section of the body portion and a third leg extends between and connects the first and second legs, wherein the first, second and third legs of the carabiner assembly define another opening. The carabiner assembly can also have only two legs.

It is an object of the present invention to provide an improved tool assembly.

It is another object of the present invention to provide an improved tool assembly having a carabiner-type attaching mechanism.

It is yet another object of the present invention to provide an improved tool assembly wherein the tool is a screwdriver having a carabiner-type handle assembly.

Still a further object of the present invention is to provide an improved tool assembly wherein the screwdriver comprises a plurality of interchangeable screwdriver heads, and/or allan wrench-type bit heads.

It is still an additional object of the invention to provide an improved tool assembly wherein the tool is a tape measure having a carabiner-type handle assembly.

Other objects of the invention will in part be obvious and will in part be apparent from the following description.

The invention accordingly comprises assemblies possessing the features, properties and the relation of components which will be exemplified in the products hereinafter described, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 1 is a side elevational view of a first embodiment of the tool assembly of the present invention, showing in cut out the plurality of screwdriver heads in the body;

FIG. 2 is a bottom plan view of the tool assembly of FIG. 1;

FIG. 3 is a side elevational view of a second embodiment of the tool assembly of the present invention, showing in cut out the measuring tape in the body; and FIG. 4 is a bottom plan view of the tool assembly of FIG. 3.

DETAILED DESCRIPTION OF THE PREFERRED EMBODIMENTS

In the following description, for purposes of explanation, specific numbers, materials and configurations are set forth in order to provide a better understanding of the invention. It will be apparent, however, to one having ordinary skill in the art that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment," if any, in various places in the specification are not necessarily all referring to the same embodiment.

Referring now to the figures, it is seen in FIGS. 1 and 2 that a tool assembly 10 is provided. Tool assembly 10 is comprised of body section 20 and carabiner-type handle section 50.

Body section 20 is of a cylindrical/bulbous shape, which shape allows it to store therein a tool 80. Tool 80 in the embodiment shown in FIGS. 1 and 2 comprises a plurality of screwdriver heads. In a preferred embodiment, the plurality of screwdriver heads is four (4) screwdriver heads 82, 84, 86 and 88 (hereinafter "82-88"), with two of these heads being flat head screwdrivers and the other two being philips head screwdrivers. For purposes of the figures, it makes no difference which of heads 82-88 are flat and which are philips. It is further to be understood that of the two flat head screwdrivers and two philips head screwdrivers, one will be smaller while the other is larger. This "size" differentiation between the screwdriver heads 82-88 does not refer to the length of the screwdriver head, and also does not refer to the width of the screwdriver head, but instead refers to the size of the tips of the flat and philips head portions, so that different size screw heads are more easily accommodated. In another embodiment heads 82-88 may comprise allan wrench-type tips or other tips known in the art, and/or a combination of screwdriver heads and allan wrench-type bit heads.

Body 20 also has an opening 90 extending therethrough from its outside surface to the inner chamber thereof. For purposes of interchangeable placement into opening 90 of body 20, heads 82-88 are all of substantially the same longitudinal length L and width W. In this way, head 82 may be placed into opening 90 of body 20 for use in attending to insertion or removal of a screw, and then once the screw is all the way in or all the way out, head 82 can be removed from opening 90 and head 86 can substitute therefore, when, for example, a larger or smaller thread size is needed for a larger or smaller threaded screw, or if one needs to switch from a philips/flat head to a flat/philips head, or to an allan wrench-type head.

Heads 82-88 are held within opening 90 in manners known in the art; for example, by octagonal or hexagonally shaping the width W of these heads to correspond to the walls of opening 90 having a similar receiving shape (not shown). Raised nubs 92 may be placed on one, or multiple, of the flat surfaces of the longitudinal length of the portion of heads 82-88 that go into opening 90, in order to retain the heads within opening 90, as is also known in the art.

Finally regarding body 20 of tool assembly 10 of the embodiment of FIGS. 1 and 2, plurality of heads 80 may be received onto/into a slidable drawer 94. Drawer 94 is designed to hold all of the plurality of heads 80, and is able to be selectively slid into and out of body 20 for secure holding within body 20 of the heads, or for removal of the heads from body 20 for use in opening 90, respectively. It is to be understood that the invention is also meant to cover other manners of storing plurality of heads 80 within body 20 of tool assembly 10. Such other types of constructions might consist of providing a pivotable door that opens outwardly (not shown) from one side of body 20 for access into the interior chamber of body 20 where heads 80 are stored between their various usages. Yet another type of construction for access into the interior chamber of body 20 to remove and/or replace heads 80 would be to use a sliding door (not shown) on one, or both, sides of body 20. Other similar types of constructions are anticipated herein.

It is also to be understood herein that the tool may be comprised solely of one tool bit received within opening 90. In this regard, if the tool is a screwdriver head, it can be either a flat or philips head bit, or a dual-head screwdriver bit having screwdriver heads on either side, as for example, two flat heads or two philips heads or even a flat head on one side and a philips head on the other side. The tool can even be in the form of an allan wrench-type bit head, or a dual-sided allan wrench-type bit head. In such an embodiment, no storage component is anticipated, although one might exist.

Turning now to the embodiment of FIGS. 3 and 4, we are again faced with tool assembly 10 having a body portion 20 and a carabiner-type handle portion 50. In this embodiment, however, tool 80' is a measuring tape. Measuring tape 80' is located within body 20 in the inner chamber and is preferably rotatably mounted around a dowel 96.

In this embodiment of tool assembly 10, it is anticipated that the assembly operate as a typical tape measure, whereby the spool of measuring tape 80' has a leading edge 100 extending out from an opening 90 in body 20 and that a user of assembly 10 will simply need to pull on leading edge 100 in the normal use of a tape measure. In this embodiment, opening 90 is sized so as to just allow the longitudinal length of measuring tape 80' to extend therethrough, yet being smaller in size than the size of an end cap 102 on leading edge 100. In this way, end cap 102 acts as a full retraction prevention device since it prevents leading edge 100 from automatically retracting all the way into the inner chamber of body 20 once measuring tape 80' is released.

It is further understood herein that tool assembly 10 may comprise another retraction prevention device 94 located along an outside surface of body 20 which, as is known in the art, will exert pressure onto/against measuring tape 80' to prevent it from automatically retracting around dowel 96 when tape 80' is released by a user. Other constructions of a standard operating tape measure are anticipated herein.

It is also anticipated herein that tool assembly 10 can be made of any of the well known standard materials for making the same, including metal, metal alloys, rigid plastics, and/or other such known materials.

It is also to be understood herein that assembly 10 will in its normal construction be made from two separate halves 12 and 14 that are adhered together in manners known in the art for adhering such materials as metals and/plastics; such as, but not limited to, using adhesives and/or screws. While body 20 may be so sealed together, it is understood that opening 90 is not sealed, and instead allows receipt of tools 80 and 80' therethrough.

Turning now to a discussion of carabiner-type handle assembly 50, it will be seen that carabiner 50 in a preferred embodiment has a first leg 60, a second leg 70, and a third leg 74. First leg 60 has gate assembly 62 extending therealong as an integral part thereof. Gate 62 is constructed in the known ways of making carabiner gates which are automatically closable upon release, including using spring-loaded mechanisms or a flexible gate construction. If using a flexible gate construction, arm 61 of gate 62 is molded of a flexible material having a "memory" for its starting position, so that after arm 61 is bent and gate 62 is opened, arm 61 will return to the closed position after it is released by the user. In these particular embodiments, pivot element 64 of gate assembly 62 is on portions of first leg 60 closer to body 20 than to third leg 74. In this manner, gate assembly 62 opens closer to third leg 74 allowing for easier attachment of assembly 10 onto such items as belt loops, utility belts, handbags, etc., as well as removal thereof.

Unless otherwise expressly indicated, when used throughout this document the term "substantially" shall have the meaning, "being largely but not wholly that which is specified." See, *Webster's Ninth New Collegiate Dictionary*, Merriam-Webster Inc., 1989. Hence, applicant is not using the term "substantially" to denote "considerable quantity" or "significantly large," but is instead using the term as a qualifier/minimizer of a term. For example, in the phrase "the head portion is substantially above the body portion," "substantially above" is meant to indicate that most of the head portion is located above the body portion, but there might be some of the head portion located in planes with the body portion, or even below parts of the body portion. As a further example, the phrase "substantially hollow," is meant to indicate that the item is almost totally hollow, but there might be small areas where it is not. These examples are meant to be illustrative of the meaning to be attributed to the term "substantially" as used throughout this document, even if these particular phrases are not found herein.

It is also to be understood that when used throughout this document the phrase "at least one" is meant to mean one or more.

It will thus be seen that the objects set forth above, among those made apparent from the preceding description, are efficiently attained, and since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the geneeric and specific features of the invention herein described and all statements of the scope of the invention, which, as a matter of language, might be said to fall therebetween.

The invention claimed is:

1. A tool assembly, comprising:
   at least one elongate tool;
   a body portion comprising:
      a housing portion having an interior chamber for storing said tool therein; and
      an opening on said body portion sized to be only slightly larger than needed to accept said tool or pass said tool therethrough longitudinally; and
      a retaining element retaining said tool with respect to said body portion against longitudinal movement in a manner that a portion of said tool extends from said body portion through said opening when said tool assembly is in condition to be used as a tool; and
   at least one attachment element constructed to extend from said body portion, constructed and positioned so that said tool extends away from said body portion and said attachment element when said tool is in a position of use, said attachment element comprising at least first and second leg assemblies, with one of said leg assemblies having a selectively openable gate assembly extending therealong.

2. A tool assembly as in claim 1, said tool being a plurality of screwdriver heads.

3. A tool assembly as in claim 2, said plurality of screwdriver heads comprising at least one flat head screwdriver head and at least one Philips head screwdriver head.

4. A tool assembly as in claim 3, wherein said at least one flat head screwdriver head is one smaller flat head screwdriver head and one larger flat head screwdriver head and wherein said at least one Philips head screwdriver head is one smaller Philips head screwdriver head and one larger Philips head screwdriver head.

5. A tool assembly as in claim 2, further comprising access means for selective removal and/or selective secured holding of said plurality of screwdriver heads.

6. A tool assembly as in claim 5, wherein said access means is a slidable drawer.

7. A tool assembly as in claim 5, wherein any one screwdriver head of said plurality of screwdriver heads is selectively removable from said access means and selectively insertable into said opening in said body portion along a portion of said longitudinal length thereof for use of said tool assembly as a screwdriver.

8. A screwdriver handle assembly, comprising:
   a screwdriver set including at least one elongate screwdriver head;
   a body portion including means defining a first opening dimensioned to receive said screwdriver head lengthwise therein; and
      a first leg constructed to extend from said body portion and having a selectively openable gate assembly extending therealong;
      a second leg constructed to extend from said body portion; and
      a third leg extending between and connecting said first and second legs, said first, second and third legs defining a second opening therebetween when said gate assembly is in a closed position, said first and second opening being disposed relative to each other so that said screwdriver head extends in a direction away from said second opening when in a position of use.

9. A screwdriver handle assembly as in claim 8, said screwdriver set comprising a plurality of interchangeable screwdriver heads selectively receivable within said opening in said body portion.

10. A screwdriver handle assembly as in claim 9, said plurality of interchangeable screwdriver heads comprising at least one flat head screwdriver head and at least one Philips head screwdriver head.

11. A screwdriver handle assembly as recited in claim 10, wherein said at least one flat head screwdriver head is one smaller flat head screwdriver head and one larger flat head screwdriver head and wherein said at least one Philips head screwdriver head is one smaller Philips head screwdriver head and one larger Philips head screwdriver head.

12. A screwdriver handle assembly as recited in claim 8, said gate assembly comprising a pin and a gate arm, said gate arm being selectively pivotable about said pin.

13. A screwdriver handle assembly as recited in claim 8, said gate assembly comprising a resilient gate arm extending from said body portion.

14. A tool assembly, comprising:
   an elongate tool;
   a body portion including means defining an opening sized to receive said tool longitudinally;
   a retainer retaining said tool so that a portion of said tool extends from said body portion through said opening when said tool assembly is in condition to be used as a tool; and
   at least one attachment assembly constructed to extend from said body portion constructed and positioned so that said tool extends away from said body portion and said attachment assembly when said tool is mounted in a position of use, said attachment comprising at least first and second leg assemblies, with one of said leg assemblies having a selectively openable gate assembly extending therealong.

15. A tool assembly as recited in claim 14, said tool being a screwdriver.

16. A tool assembly as recited in claim 15, said screwdriver comprising a dual-head screwdriver bit.

17. A tool assembly as recited in claim 16, said dual-head screwdriver bit comprising a flat screwdriver head and a Philips screwdriver head.

18. A tool assembly as recited in claim 16, said dual-head screwdriver bit comprising a first Allan wrench head and a second Allan wrench head.

19. A tool assembly as recited in claim 14, said gate assembly comprising a pin and a gate arm, said gate arm being selectively pivotable about said pin.

20. A tool assembly as recited in claim 14, said gate assembly comprising a resilient gate arm extending from said body portion.

21. A tool assembly as in claim 15, further comprising at least one additional screwdriver defining, together with said tool, a screwdriver set with interchangeable screwdriver heads selectively receivable within said opening.

22. A tool assembly as in claim 21, said interchangeable screwdriver heads comprising at least one flat head screwdriver head and at least one Philips head screwdriver head.

23. A tool assembly as recited in claim 22, wherein said at least one flat head screwdriver head includes one smaller flat head screwdriver head and one larger flat head screwdriver head and wherein said at least one Philips head screwdriver head includes one smaller Philips head screwdriver head and one larger Philips head screwdriver head.

24. A tool assembly as recited in claim 15, said gate assembly comprising a pin and a gate arm, said gate arm being selectively pivotable about said pin.

25. A tool assembly as recited in claim 15, said gate assembly comprising a resilient gate arm extending from said body portion.

* * * * *